3,577,274
RESIN COATINGS CONTAINING ZINC INCLUSIONS
Charles W. Taylor, Jr., Akron, and Daniel T. Conrad, Cuyahoga Falls, Ohio, assignors to The Goodyear Tire & Rubber Company, Akron, Ohio
No Drawing. Filed Nov. 15, 1968, Ser. No. 776,267
Int. Cl. H01l 5/16
U.S. Cl. 117—213                                         8 Claims

ABSTRACT OF THE DISCLOSURE

Corrosion resistance together with electrical insulation is provided for ferrous substrates by a solid resinous coating containing between 9 to 35 percent by weight (1.6 to 10 percent by volume) of pulverulent zinc in a heat fusible resin such as polyester. The coating may be applied by any suitable powder coating method, e.g. fluidized-bed. The application process and articles produced thereby are disclosed.

---

The present invention relates to an article of manufacture comprising a ferrous metal substrate with a resin coating containing powdered zinc metal inclusions in an amount whereby the coating is an electrical insulator as well as a deterrent to corrosion. More particularly, this invention relates to coated ferrous metal objects whereby the coating is applied by powder coating techniques. In its preferred mode, the invention refers to articles such as an electrical transformer box and the disclosed method of coating it.

BACKGROUND

It is presently known to apply resin coatings to ferrous metal substrates to protect them against corrosion or rusting. This resin coating may be applied from solvent solution or liquid suspension, as for example a paint, or as a dry powder with which the application of heat coalesces the individual particles into a continuous layer, as for example by the fluidized-bed technique.

It is also known to include pulverulent, i.e. finely powdered, metallic zinc in such paint type coatings. The zinc, when present in large proportions, is claimed to improve the protection of the ferrous metal substrate by a mechanism referred to as "cathodic" protection. Here the zinc is oxidized in preference to the more noble iron, and thus protects the latter from corrosion until the zinc is consumed. Cathodic protection in such coatings has been understood to operate on the principle that there was direct electrical conductivity between the zinc particles and the ferrous substrate. It has been thought that direct electrical conductivity between the metal elements was necessary in order to protect the ferrous substrate by low potential electron transfer from the zinc particles to the ferrous substrate, rendering it cathodic to the surrounding medium. Such coatings are generally referred to as "zinc-rich," and to be so classified must be considered "resin-starved," or contain only enough resin to physically hold the zinc particles together, and not enough resin by volume to fill all the void space between the zinc particles, thus isolating them from one another and insulating each particle electrically. In such zinc-rich coatings, the amount of zinc would normally be 75–95 percent by weight, and usually is about 85 percent by weight of the dried coating. Depending upon the specific gravity of the particular resin binder, the zinc particles would normally be from 34 percent to 78 percent by volume, and are usually about 65 percent by volume of the dried coating. Such coatings have generally been applied either as cross-linking liquid, organic or inorganic resin systems, or as solvent-thinned paint coatings.

In recent years it is becoming more common to locate power supply equipment, such as transformer boxes or tanks, underground. As a consequence, the corrosion problems for such equipment have become increasingly severe. However, it is desirable that this type equipment be electrically insulated from the surroundings. Zinc-rich coatings are therefore considered undesirable for corrosion protection of such equipment or underground structures.

Applicants have discovered that by including an amount between 9 percent and 35 percent by weight (1.6 to 10.0 percent by volume) of pulverulent zinc metal in a powder coating resin that an electrically insulative coating with improved corrosion resistance may be applied to ferrous objects such as transformer tanks and accessories. This type of coating has the dual advantage of providing the ferrous object with improved corrosion resistance as well as electrical insulation at least in the amount of 230 volts per mil dielectric strength.

The coating material may be applied by any suitable powder coating method such as fluidized-bed, powder-spray, cyclone, or flame- or arc-spray (conventional or electrostatic) techniques. Care should be exercised to see that the zinc powder is reasonably, uniformly dispersed in the resin. Large agglomerates of zinc particles reduce the effectiveness of the coating as electrical insulation. The invention is illustrated with respect to preparation of the coating material by dispersion of the zinc particles into the resin in a Banbury-type mixer wherein the resin becomes plastic through an increase in temperature. Other methods such as a two-roll rubber mill or a compounding extruder may be used to accomplish the dispersion of the zinc into the polymer. After subsequent hardening, the compounded coating material is pulverized to the appropriate size for the resin powder application technique to be employed. The preferred particle-size distribution of a powder for fluidized-bed application is as follows:

| Through a No.— | Percent |
|---|---|
| 60 U.S. Standard Screen | 100 |
| 100 U.S. Standard Screen | 90 |
| 200 U. S. Standard Screen | 40 |
| 325 U.S. Standard Screen | 5 |

The resin particles should be essentially spherical in shape as opposed to fibrous or needle-like. The particle-size distribution is not particularly critical for fluidized-bed type application, but may need special adjustments for best application by other methods, such as electrostatic powder-spray. Persons skilled in the art of powder coating are familiar with the particle-size distribution employed with various coating methods.

The invention is illustrated by the fluidized-bed coating technique, wherein the heat capacity of the preheated ferrous article is utilized as the sole heat source for fusion of the coating. Variations of this technique are possible and are often desirable; such as using a lower preheat temperature for the article and post-heating the object to complete the fusion of the coating powder; or by rapidly quenching the coated part in a liquid coolant, rather than allowing the coated object to cool slowly in the atmosphere. To a large extent, the particular thermal properties of the resinous portion of the coating, the heat capacity of the particular object being coated, and the thickness of coating desired, govern the thermal cycle required for efficient coating application by a given powder coating technique.

Any number of suitable resins may be employed within the scope of this invention. Linear thermoplastic co-polyester resins have been found suitable and are preferred for applications such as transformer boxes. Mixtures of polyester resins, such as disclosed in United States Patent 3,382,295, are especially useful. Other suitable resins which may be employed are epoxy and phenoxy resins as well as some polyvinyl chloride, polycarbonate, polyethylene, phenolic, and chlorinated hydrocarbon resins. Persons skilled in the coating art will know which resins are suitable for a given application technique and product end use. Various compounding ingredients, such as plasticizers, stabilizers, viscosity modifiers, pigments, and colorants may also be incorporated into the coating material. The zinc particles should preferably be between 5- and 10-microns in average diameter. A suitable product for use in practicing the invention is known commercially as "zinc-dust" and would comply with Federal Specification TT–P–460, Type I (98 percent will pass a number 325 U.S. Standard Screen). Other grades of zinc powders may be utilized including those with some surface treatment to modify their reactivity or compatibility in a given system.

It has been found that zinc, in the amount of between 9 and 35 percent by weight of the resin coating, achieves the desired result of substantially improving the corrosion resistance of the coated object as determined by the ASTM–B–117 Salt-Fog Test, while still achieving satisfactory electrical insulation properties. Corrosion resistance, as measured following the standard salt-fog exposure of 1000 hours, is determined by the spreading of corrosion from an intentional fault in the coating. Those coatings which allow only a very small amount of undercutting or spreading of corrosion are considered superior. The most useful resins are those which exhibit very high electrical insulative properties in the unmodified resin, and show substantial improvement in corrosion resistance of the coated object at 20 to 30 percent zinc by weight (4 to 8 percent by volume) in the resin coating.

Electrical insulation values are herein illustrated as the dielectric strength measured on actual coatings, with the coated ferrous substrate serving as one electrode. With this exception, tests were conducted according to the ASTM–D–149 Short-Time Test procedure for sheets and plates. Electrical properties of "zinc-rich" coatings appear frequently in the literature as resistivity measurements with values approaching 0. Such values are significant when evaluating conductive materials. Dielectric strength values for "zinc-rich" coatings are very low and consequently are not a useful measurement for such coatings.

Applicants have discovered an additional advantage of the inclusions of the specified amounts of zinc in the resinous powder coatings. The zinc inclusions improve the thermal conductivity characteristics of the resin coating which is an aid in manufacturing both during the sintering of the resin powder and in the subsequent cooling step in fusion coating methods. Depending on the use of the end product, improved thermal conductivity of the coating may also benefit overall performance; as for example where heat dissipation from an article such as a transformer box is desired.

It is obvious that many other metallic pigments or particular materials of high thermal conductivity, such as aluminum or stainless steel pigments, or aluminum oxides, could be utilized to produce a coating with increased thermal conductivity.

EXAMPLES

The practice of this invention is illustrated by reference to the following examples which are intended to be representative rather than restrictive of the scope of this invention.

Example 1

One hundred parts by weight of a high molecular weight copolyester of ethylene glycol, neopentyl glycol and terephthalic acid in which the ethylene terephthalate units and neopentyl terephthalate units were present in a molar ratio of 67:33, which had an intrinsic viscosity of 0.65 and a softening point of 174° C. (Polyester A); 4.5 parts of titanium dioxide powder and 0.5 part of an inorganic color pigment were placed in a cold Banbury-type mixer and mixed until the resin became plastic and the pigments were thoroughly dispersed throughout the resin. During the mixing period of about 10 minutes, the temperature of the resin batch was controlled in the usual manner with cooling water through the jacket of the mixer, so that it ranged from room temperature at the beginning to about 180° C. at discharge. When the resin-pigment mixture was discharged from the mixer, it was cut into small pieces while still plastic and cooled.

The cooled resin-pigment mixture was ground to a particle size of less than 40 mesh (U.S. Standard) in a powder-grinding machine. The powder was applied to cleaned 10-gauge steel panels by the well-known fluidized-bed technique to produce coatings of 10±1 mils thick. The ferrous metal panels were preheated to 288° C., immersed in the bed of fluidized powder for 2½ seconds, withdrawn, and allowed to sinter and cool in the atmosphere for 30 minutes.

Example 2

A high molecular weight copolyester resin which contained 60 percent of ethylene terephthalate and 40 percent ethylene isophthalate, which had an intrinsic viscosity of 0.61 and a softening point of 158° C. (Polyester B) was ground to a particle size of less than 40 mesh in a powder grinding machine. Coatings of 10±1 mils thickness were applied to cleaned 10-gauge steel panels utilizing the clear uncompounded resin powder by the fluidized-bed technique.

Example 3

One hundred parts by weight of a high molecular weight copolyester resin containing 60 percent of ethylene terephthalate and 40 percent ethylene isophthalate, which had an intrinsic viscosity of 0.65 and a softening point of 158° C. (Polyester B) and 50 parts of rutile titanium dioxide conforming to Federal Specification TT–T–425a, Type II were mixed together, ground to powder, and applied to steel panels as in Example 1.

Example 4

One hundred parts by weight of a high molecular weight copolyester resin, containing 60 percent of ethylene terephthalate and 40 percent ethylene isophthalate, which had an intrinsic viscosity of 0.65 and a softening point of 158° C. (Polyester B), 32 parts of zinc powder conforming to Federal Specification TT–P–460, Type I, 17.5 parts of rutile titanium dioxide conforming to Federal Specification TT–T–425a, Type II, 10 parts of a chlorinated hydrocarbon resinous viscosity modifier; and 0.3 part of an inorganic color pigment were mixed together, ground into a powder, and applied to steel panels as in Example 1.

Example 5

One hundred parts by weight of a high molecular weight copolyester resin containing 60 percent ethylene terephthalate and 40 percent ethylene isophthalate, which had an intrinsic viscosity of 0.65 and a softening point of 158° C. (Polyester B), 35 parts of zinc powder conforming to Federal Specification TT–P–460, Type I, 18.85 parts of ground limestone calcium carbonate powder, and 0.6 part organic phosphite antioxidant were mixed together, ground into a powder and applied to steel panels as in Example 1.

Example 6

One hundred parts by weight of a high molecular weight thermoplastic resin made from bisphenol-A and epichlorohydrin, and known as phenoxy polymer (Bakelite PAHJ Phenoxy Resin, Union Carbide Corporation) or polyhydroxy ether resin of approximately 30,000 molecular weight, 58.9 parts of zinc powder conforming to Federal Specification TT–P–460, Type I, 12 parts of chlorinated hydrocarbon resinous viscosity modifier, and 8 parts of chlorinated hydrocarbon liquid viscosity modifier, were fusion mixed, ground into a powder, and applied to steel panels as in Example 1.

Example 7

Seventy parts by weight of a 67:33 molar ratio ethylene terephthalate-neopentyl terephthalate copolyester resin which had an intrinsic viscosity of 0.75 and a softening point of 174° C.; 30 parts by weight of a copolyester of ethylene glycol, neopentyl glycol, terephthalic acid and sebacic acid in which the ethylene glycol units and neopentyl glycol units were present in the molar ratio 80:20 and the terephthalic acid units and sebacic acid units were present in the molar ratio of 80:20 which had an intrinsic viscosity of 0.775 and a softening point of 151° C. (Polyester Blend); and 5 parts of rutile titanium dioxide conforming to Federal Specification TT–T–425a, Type II, were mixed together, ground to powder, and applied to steel panels as in Example 1.

Example 8

Seventy parts by weight of a 67:33 molar ratio ethylene terephthalate-neopentyl terephthalate copolyester resin which had an intrinsic viscosity of 0.75 and a softening point of 174° C.; 30 parts by weight of a copolyester of ethylene glycol, neopentyl glycol, terephthalic acid and sebacic acid in which the ethylene glycol units and neopentyl glycol units were present in the molar ratio 80:20 and the terephthalic acid units and sebacic acid units were present in the molar ratio of 80:20 which had an intrinsic viscosity of 0.775 and a softening point of 151° C. (Polyester Blend); 20 parts by weight of zinc powder which complies to Federal Specification TT–P–460, Type I; 10 parts by weight of a resinous chlorinated hydrocarbon viscosity modifier and 5.3 parts by weight of anatase titanium dioxide powder which complies with ASTM Specification D–476–48, Class I were fusion mixed, ground to powder, and applied to panels as in Example 1.

Typical values obtained in testing these coated steel panels are combined in Table I.

While certain representative embodiments and details have been shown for the purpose of illustrating the invention, it will be apparent to those skilled in the art that various changes and modifications may be made therein without departing from the spirit or scope of the invention.

TABLE I

| Coating of Example No. | Resin blend | Volume percent zinc | Weight percent zinc | ASTM-B-1505 specific gravity, 30° C. | ASTM-B-117 undercutting after 1,000 hours exposure (inch) | ASTM-D-149 dielectric strength, v./mil |
|---|---|---|---|---|---|---|
| 1 | Polyester A. | 0 | 0 | 1.34 | 0.27 | 1190 |
| 2 | Polyester B. | 0 | 0 | 1.34 | 0.14 | 1400 |
| 3 | do | 0 | 0 | 1.71 | 0.10 | 1350 |
| 4 | do | 5.1 | 20.0 | 1.79 | 0.03 | 583 |
| 5 | do | 5.7 | 22.7 | 1.77 | 0.03 | 447 |
| 6 | Phenoxy. | 8.0 | 32.9 | 1.70 | 0.04 | 230 |
| 7 | Polyester blend. | 0 | 0 | 1.37 | 0.51 | 1110 |
| 8 | do | 3.2 | 14.8 | 1.53 | 0.19 | 690 |

What is claimed is:

1. An article of manufacture comprising a plastic-coated ferrous substrate wherein said coating contains from 9 to 35 percent by weight of pulverulent zinc uniformly dispersed therein and has a dielectric strength of at least 230 volts per mil.

2. The product of claim 1 wherein the zinc has an average particle diameter between 5 and 10 microns.

3. The product of claim 1 wherein the resinous portion of the plastic coating is at least one linear thermoplastic polyester resin.

4. The product of claim 1 wherein the resinous portion of the plastic coating is at least one linear thermoplastic resin and wherein the zinc has an average particle diameter between 5 and 10 microns.

5. The product of claim 1 wherein the coating resin contains from 20 to 30 percent by weight of zinc.

6. The product of claim 1 wherein the coating resin contains from 20 to 30 percent by weight of zinc having an average particle diameter between 5 and 10 microns and said coating resin consists of at least one linear thermoplastic polyester resin.

7. In the process of coating a ferrous substrate with a resinous coating by heating the substrate to a temperature above the fusion temperature of the resinous material and contacting the heated substrate with a pulverulent form of the resinous material which fuses thereon to form a continuous coating, the improvement which comprises employing a coating resin containing uniformly dispersed therein from 9 to 35 percent by weight of zinc having an average particle diameter between 5 and 10 microns and wherein said zinc-containing resin coating has a dielectric strength of at least 230 volts per mil.

8. The process according to claim 7 wherein the coating resin contains from 20 to 30 percent by weight of zinc.

References Cited

UNITED STATES PATENTS 3,085,025   4/1963   Eaton _____ 117—160X
3,377,193   4/1968   Stilmar _____ 117—160X WILLIAM L. JARVIS, Primary Examiner U.S. Cl. X.R.

117—132, 160, 227